Aug. 22, 1967        A. STEIGER        3,336,911
SUPERCHARGED DIESEL ENGINE AND METHOD OF OPERATING THE SAME
Filed Jan. 26, 1965                     3 Sheets-Sheet 1

Inventor:
Anton Steiger
BY Pennie, Edmond
Morton, Taylor and Adam
ATTORNEYS

United States Patent Office 3,336,911
Patented Aug. 22, 1967

3,336,911
SUPERCHARGED DIESEL ENGINE AND METHOD
OF OPERATING THE SAME
Anton Steiger, Zurich, Switzerland, assignor to Sulzer
Brothers Limited, Winterthur, Switzerland, a Swiss company
Filed Jan. 26, 1965, Ser. No. 428,072
Claims priority, application Switzerland, Jan. 31, 1964,
1,240/64
4 Claims. (Cl. 123—119)

The present invention relates to a supercharged diesel internal combustion engine having a reduced effective compression stroke, and to a method of operating the same. The invention provides an engine of this type in which the air for support of combustion is cooled after compression in the supercharger. More particularly, in accordance with the invention, the effective length or duration of the compression stroke remains fixed despite variation in the engine output, and instead the cooling of the combustion or "charging" air is varied with output, being reduced with decreasing output.

Supercharged four-stroke cycle reciprocating internal combustion engines having a reduced effective compression stroke are known. In such engines the effective compression stroke is shortened by causing the inlet valve or valves for each cylinder to close either before or after the crankshaft reaches bottom dead center between the intake and compression strokes, instead of at bottom dead center. In the case of closure before bottom dead center, the intake air in the cylinder expands during the remainder of the intake stroke of the piston down to bottom dead center position. In the case of closure after bottom dead center, the compression stroke starts after bottom dead center, namely when the inlet valve closes. It has been found, and theoretical reasons therefor will be advanced hereinafter, that an engine having a reduced effective compression stroke has a lower specific fuel consumption which other engines cannot achieve in operation. Unfortunately, conventional engines of this kind are of complicated construction in that, if difficulties in operation are to be avoided, the engine must for operation at partial load have provision for shifting the inlet valve closure time toward the full compression stroke, i.e., toward bottom dead center. The necessity of making provision for varying the timing of the inlet valve closure increases the cost of known engines and forms a source of possible trouble.

It is an object of the invention to provide, in an engine having a reduced compression stroke, a simpler and more reliable control for partial load operation.

Figure 1:
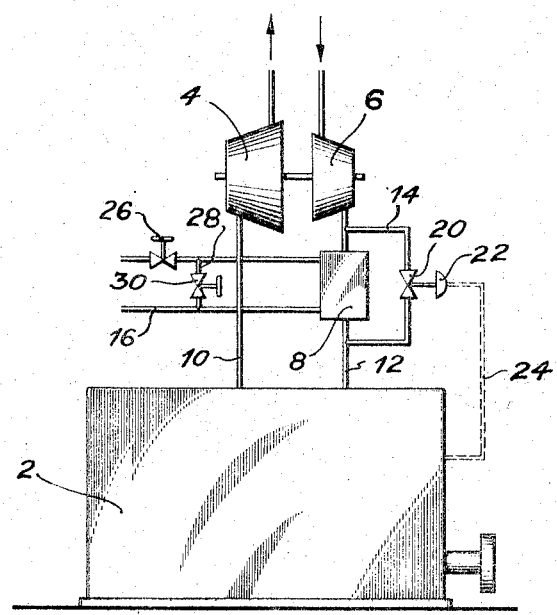
Figure 2:
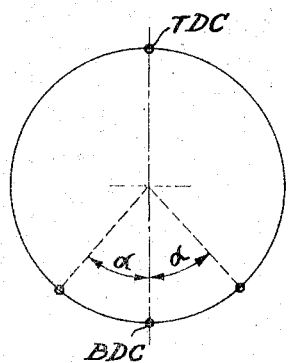
Figure 3:
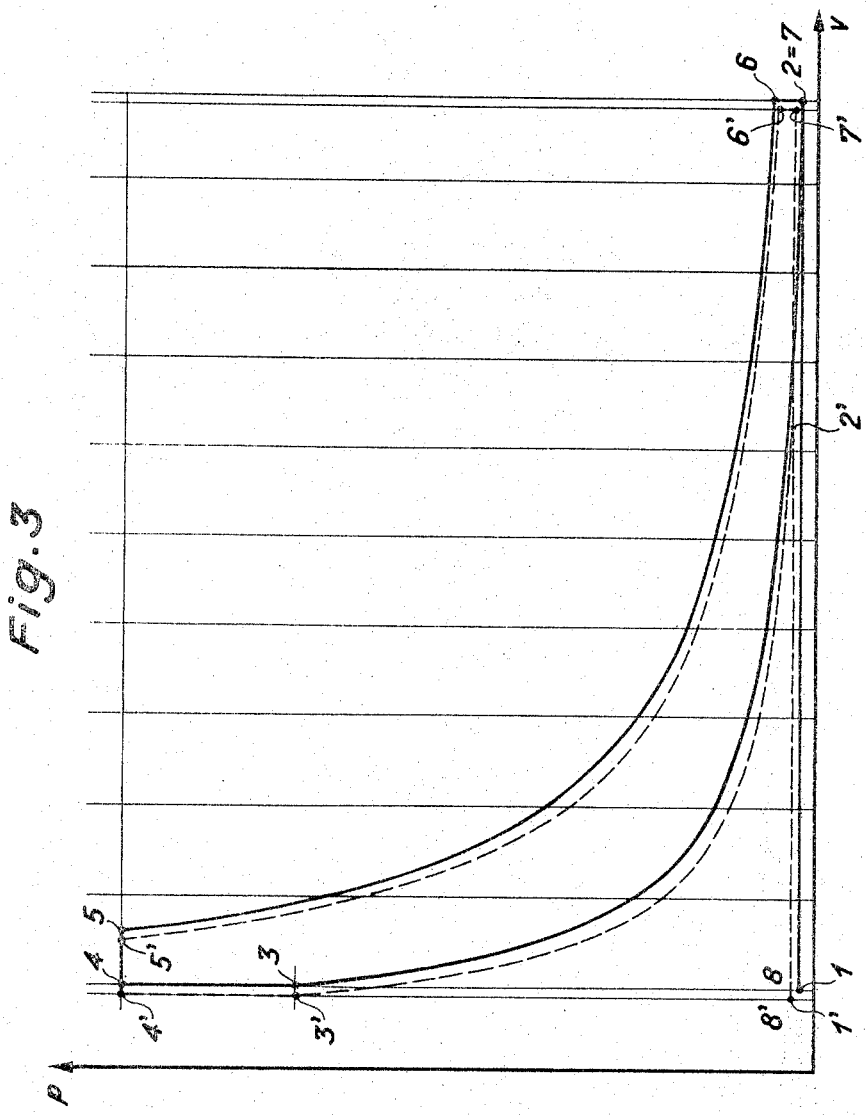
Figure 4:
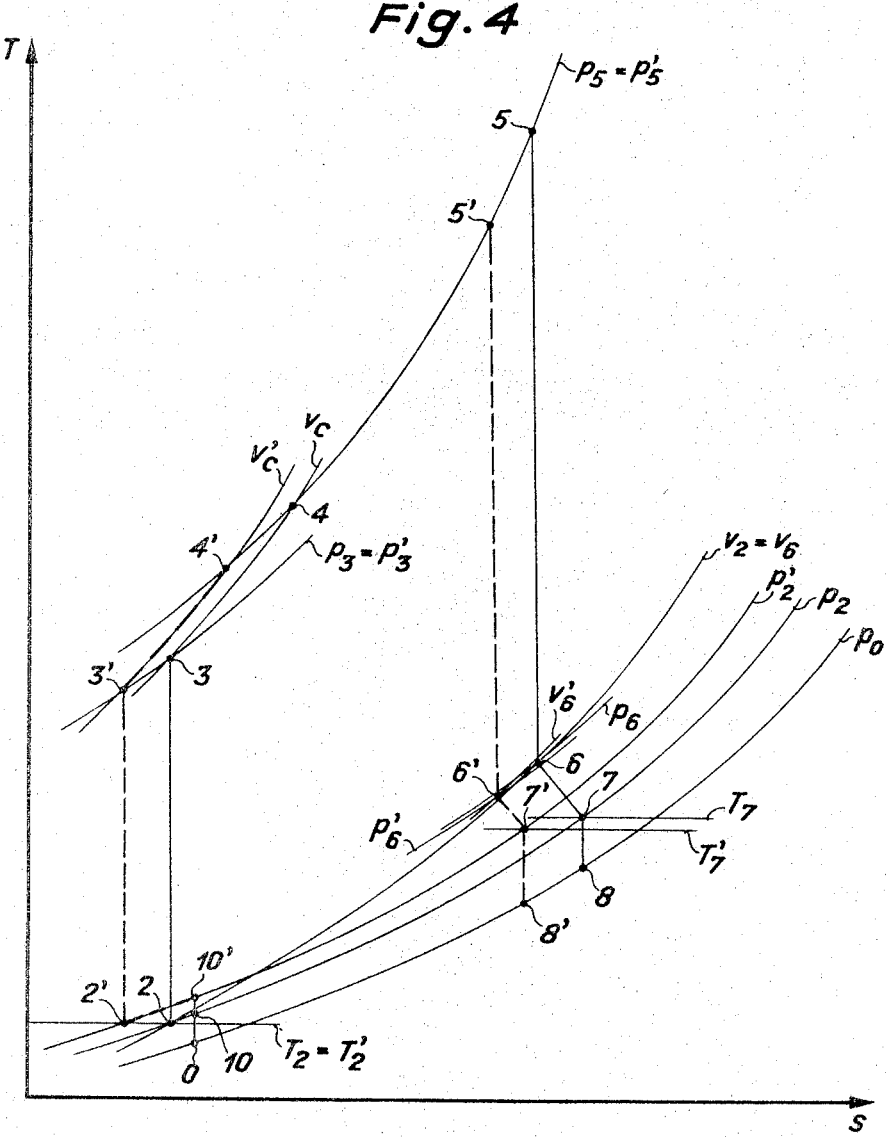

The invention will now be further described with reference to the accompanying drawings wherein:

FIG. 1 shows a diagrammatic arrangement of an internal combustion engine according to the invention;
FIG. 2 is an idealized crankshaft angle diagram; and
FIGS. 3 and 4 are idealized P-V (pressure-volume) and T-S (temperature-entropy) diagrams respectively, useful in explaining the invention.

In FIG. 1, reference character 2 designates an internal combustion engine having a reduced effective compression stroke, which engine may be of a type known per se. Associated therewith is an exhaust gas turbine 4 driving a compressor 6 for supercharging of combustion air to be delivered to the engine through an air cooler 8. The exhaust gases from the engine pass through a conduit 10 and drive the gas turbine 4 which is mechanically coupled to the compressor 6. Air aspirated by the compressor is delivered at a line 12 which passes through the cooler 8 to the engine. A line 14 serves as a bypass for line 12 around the cooler 8. A coolant such as water is circulated through the cooler by means of a line 16.

The cooler thus constitutes a heat exchanger through which there is circulated on the primary or hot side air compressed by the supercharger and through which there is circulated on the secondary or cool side a coolant fluid for removal of heat.

Bypass line 14 includes a throttling element 20 which is adjusted in position by means of a controller 22, responsive to an engine parameter such as engine speed which varies according to the position of the engine in its range of operation. A signal representative of this parameter is delivered to controller 22 from the engine via a signal channel 24. The coolant line 16 may include an adjustable valve 26 or a bypass 28 having a valve 30 therein, or both, bypass 28 connecting the line 16 around the cooler and serving to shortcircuit the cooler.

FIG. 2 shows in idealized form the crankshaft angle diagram of an engine having a reduced compression stroke. For simplicity the engine may be assumed to have a single cylinder; alternatively the crank angle diagram of FIGURE 2 may be understood to refer separately to each of plural cylinders. In a standard four-stroke cycle engine the inlet valve for any one cylinder closes theoretically at bottom dead center (BDC), but in an engine having a shortened effective compression stroke, those valves close at an angle either before or after bottom dead center.

FIG. 3 shows for comparison purposes idealized pressure volume diagrams of a standard four-stroke cycle engine in (solid lines) and of a four-stroke cycle engine having a shortened compression stroke (in dashed lines), both engines being assumed to be of the same capacity or power. Again, the discussion will be in terms of a single cylinder.

In the case of the standard four-stroke cycle engine having a complete compression stroke, intake occurs along a horizontal line 1–2 of constant pressure in FIG. 3. The inlet valve closes at the point 2 and compression then takes place at rising pressure along the solid line from 2 to 3. Between points 3, 4 and 5 heat is evolved by combustion of the injected fuel. The drop in cylinder pressure during the expansion stroke is indicated by the line between points 5 and 6. The exhaust valve opens at the point 6, and the pressure in the cylinder then drops to the pressure of the point 7, which is identical with that at the point 2. Exhaust commences along line 7–8 at which point the exhaust valve closes. Point 8 coincides with point 1.

Considering now the engine having a shortened effective compression stroke, for the same weight of gases in the cylinder the intake pressure provided by the supercharger is somewhat higher as indicated by the pressure of the dashed line between points 1′ and 2′. The inlet valves close at the point 2′, at an angle assumed to be after bottom dead center. The intake stroke thus extends from the point 1′ to the point 7′ and back to the point 2′, effective compression beginning at the point 2′. Because of the greater intake pressure, the compression from the point 2′, to the point 3′ proceeds much as in the standard engine whose diagram is given by the full lines in FIG. 3, notwithstanding the delayed start of the compression stroke in the shortened stroke engine whose pressure-volume diagram is given by the dashed lines. Similar considerations apply to the heat evolution from combustion, except that for reasons which will be explained hereinafter the end point of heat evolution occurs at point 5′ instead of point 5 and the compression volume has decreased. Consequently, the expansion stroke follows the dashed line from point 5′ to point 6′. When the exhaust valve opens at the point 6′ the pressure in the cylinder drops to that of the point 7′, i.e., to the pressure provided by the supercharger. Exhaust commences up to point 8′, which coincides again with point 1′.

Referring now to FIGURE 4, theoretical considerations will be advanced to explain the variations just mentioned between the pressure volume diagram of FIG. 3 for the standard four-stroke cycle supercharged engine and the four-stroke cycle supercharged engine of reduced effective compression stroke, and to show why supercharged engines having a reduced compression stroke have a better thermal efficiency than conventionally supercharged engines.

In order to provide a satisfactory basis for comparison, there will be assumed to apply between the engine of reduced compression stroke and the standard four-stroke cycle supercharged engine the equalities set forth in the following relations (1) to (6) for the swept volume $V_h$, for the indicated mean pressure $P_{mi}$, for the weight of the cylinder charge $G_{Lad}$, for the charging air temperatures $T_2$, for the ignition pressure $P_4$ and for the pressure increase ratio $P_4/P_3$. In Equations 1 to 6 and throughout the present application, symbols with the prime refer to the engine having a shortened effective compression stroke and those without the prime refer to the standard four-stroke cycle supercharged engine.

$$V'_h = V_h \quad (1)$$
$$P'_{mi} = P_{mi} \quad (2)$$
$$G'_{Lad} = G_{Lad} \quad (3)$$
$$T'_2 = T_2 \quad (4)$$
$$P'_4 = P_4 \quad (5)$$
$$P'_4/P'_3 = P_4/P_3 \quad (6)$$

The equality of relation (5) was chosen to insure equal mechanical peak stressing, whereas that of relation (6) corresponds to a condition found by experience to insure optimum combustion.

As already stated, in order to permit the comparison to be carried out in a way which can be checked and understood readily, calculations are based on idealized processes. Therefore, it is assumed that:

(1) Compression and expansion proceed purely adiabatically.

(2) The valve-actuating times in the standard process coincide with the dead centers.

(3) The inlet pressure is equal to the exhaust pressure and there is no heating of the air during the inlet stroke.

(4) There are no pressure losses in the air and gas piping nor in the cooler.

(5) Combustion occurs only at a constant volume and constant pressure.

(6) The weights of the gases in the cylinder stay the same throughout the process.

(7) The adiabatic exponent $k$ is independent of the temperature and of gas composition.

The following data is also assumed for these calculations:

(1) Supercharging pressure increase: $P'_2/P_2 = 1.5$
(2) Compression ratio: $\epsilon = 12.0$
(3) Supercharging: $P_2 = 1.0$ atmosphere gauge
(4) Ignition pressure: $P_4 = 85$ atmosphere gauge
(5) Pressure increase ratio: $P_4/P_3 = 1.33$
(6) Temperature of charging air at outlet end of cooler: $T_2 = 45°$ C.
(7) Combustion ratio (percentage of heat effectively supplied to gas at constant volume):

$$\frac{Qzu_v}{Qzu} = 0.22$$

(8) Adiabatic exponent: $k = 1.40$

On these assumptions the following values can be calculated from the known thermodynamic relationships:

(1) The relative shortening of the compression stroke:

$$\frac{V'_7 - V'_2}{V_h} = 1 + \frac{1}{\epsilon - 1}\left(\frac{P_2}{P'_2}\right)^{\frac{k-1}{k}} - \frac{\epsilon \cdot P_2}{(\epsilon - 1)P'_2} = 0.355$$

(2) The relative increase in compression ratio:

$$\frac{\epsilon'}{\epsilon} = \frac{1}{\epsilon} + \frac{1 - \frac{1}{\epsilon}}{(P_2/P'_2)^{\frac{k-1}{k}}} = 1.111$$

(3) The relative change of the specific pre-exhaust volume:

$$\frac{V'_6}{V_6} = \frac{\epsilon - 1 + (P_2/P'_2)^{\frac{k-1}{k}}}{\epsilon} = 0.990$$

(4) The relative reduction in compression end-temperature:

$$\frac{T'_3}{T_3} = \left(\frac{P_2}{P'_2}\right)^{\frac{k-1}{k}} = 0.890$$

(5) The indicated mean pressure of the standard process:

$$P_{mi} = \frac{P_4[KV_5 - (k-1)V_3] - V_2(P_6 - P_2) - P_3 \cdot V_3}{(k-1)V_n} =$$

$$13,550 \text{ kg./cm.}^2$$

wherein $$\frac{V_5}{V_h} = \frac{V_3}{V_h}\left[\frac{(Q_{zu}/Q_{suv} - 1)(P_5 - P_3)}{k \cdot P_5} + 1\right] = 0.150$$

and:

$$P_6 = P_4(V_5/V_2)^k = 5,380 \text{ atmospheres absolute}$$

(6) The relative volume: $V'_5/V_n = 0.142$ and therefore the pre-exhaust pressure:

$$P'_6 = P_4\left(\frac{V'_5}{V'_6}\right)^k = 5,030 \text{ atmospheres absolute}$$

can be found by iteration from the equation:

$$P_{mi} = P'_{mi} = \frac{P_4(k \cdot V'_5 + V'^{(1-k)}_6 V'^k_5) - V'_3[(k-1)P_4 + P_3] + P'_2[kV'_2 - (k-1)V'_6]}{(k-1)V_n}$$

(7) The ratio of heat effectively supplied to the gas during combustion ($Q_{zu} = Q_{fuel} - Q_{cooling}$):

$$\frac{Q'_{zu}}{Q_{zu}} = \frac{k \cdot P_4(V'_5 - V'_3) + V'_3(P_4 - P_3)}{k \cdot P_4(V_5 - V_3) + V_3(P_4 - P_3)} = 0.999$$

It is apparent from the above that substantially the same amount of heat must be supplied to the gas in both processes for a given engine power.

To see why the reduced compression stroke process requires less fuel reference must be made to the entropy diagram in FIG. 4.

In the temperature-entropy diagram, the solid lines denote the process for the standard four-stroke engine and the dashed lines denote the process for the four-stroke engine having a reduced compression stroke. The designation of the points is very similar to that in FIG. 3 except that events in the turbo-supercharger and air cooler have also been included. Thus, the vertical lines 0–10 and 0'–10' in FIG. 4 denote for the standard engine and for that having a shortened effective compression stroke respectively an adiabatic compression in the supercharger. The lines 10–2 correspond similarly to cooling of the charging air in the air cooler 8 to the temperature determined by the cooling water temperature flowing in line 16 of FIG. 1. The vertical line 2–3 represents the adiabatic compression in the engine, and the lines 3–4 and 4–5 denote the heat evolved in the cylinder by combusion of the fuel. Ideally, 22% of the heat is evolved at constant volume during the phase represented by passage from point 3 to point 4, whereafter the remaining 78% is supplied at constant pressure between points 4 and 5. The line 5–6 corresponds to adiabatic expansion in the cylinder, the line 6–7 corresponds to the opening of the exhaust valve with a resulting drop of pressure to the point 2, and the line 7–8 represents the adiabatic expansion in the turbine down to atmospheric pressure.

A main difference between the standard process and the shortened compression stroke process represented by dashed lines in FIG. 4 is that the removal of heat in the air cooler is greater than in the standard process. Consequently, the final temperature for a compression in the cylinder to a given final pressure is lower than in the standard process. And even though the same effective heat is supplied to the gas, the end temperature after combustion is lower in the shortened-stroke process than in the standard process, as indicated in FIG. 4 by the difference in temperature between points 5 and 5'. The other process temperatures are also lower in the shortened-stroke engine than in the standard engine, as the relative position of the points 3, 3', 4, 4' and 5, 5' in FIG. 4 shows. Because there are these lower temperatures in the shortened-stroke engine, the amount of heat yielded to the coolant which flows in the water jacket of the cylinders must be less for the same effective heat supply to the gas in the cylinder. Therefore, the heat evolved by combustion of the fuel may also be less. This is nothing but another way of stating that an engine having a shortened effective compression stroke must have a higher thermal efficiency than a standard engine.

The best way of getting some idea of the extent of the improvement in thermal efficiency is to compare the compression end-temperature for both cases, as calculated from the P-V diagram of FIG. 3 with the mean cylinder wall temperature, since this temperature difference is a criterion for measuring how much the heat flow from the gas to the wall has been altered. This can be calculated as follows:

$$T_3 = T_2 \left(\frac{P_3}{P_2}\right)^{\frac{k-1}{k}} = 860° K.$$

$$T'_3 = 0.890 T_3 = 766° K.$$

If we assume that the mean surface temperature $T_{w_m}$ of the cylinder wall is 450° K. (177° C.), the temperature differences are as follows:

$$T_3 - T_{w_m} = \Delta T_m = 410° K.$$
$$T'_3 - T_{w_m} = \Delta T'_m = 316° K.$$

Therefore:

$$\frac{T'_m}{T_m} = 0.770$$

This means that the cooling heat loss in the engine, i.e., to the cylinder water jackets, must be about 23% less. However, since the heat loss from the exhaust side, as will be shown hereinafter, and the mechanical efficiency $\eta_{mech}$ (as distinguished from the thermal efficiency $\eta_{th}$) have not been altered, it follows from the thermal balance of the engine that:

$$Q_{fuel} = A \cdot \eta_{mech} \cdot L_{ind} + Q_{exhaust\ gas} + Q_{coolant} \text{(Kcals. per hour)}$$

and $$Q'_{fuel} = A \cdot \eta_{mech} \cdot L_{ind} + Q_{exhaust\ gas} + Q'_{coolant} \text{(Kcals. per hour)}$$

whereby:

$$A = \frac{1}{427} \left(\frac{Kcal.}{mkg.}\right)$$

and: $L_{ind}$ = indicated mechanical output (mkg./hr.)

$$\frac{\eta_{th}}{\eta'_{th}} = \frac{Q'_{fuel}}{Q_{fuel}} = 1 - \frac{Q_{coolant}}{Q_{fuel}} + \frac{Q'_{coolant}}{Q_{fuel}}$$

If we assume that:

$$\frac{Q_{coolant}}{Q_{fuel}} = 0.200$$

then:

$$\frac{Q'_{coolant}}{Q_{fuel}} = (1 - 0.23)\ 0.200 = 0.154$$

and therefore:

$$\frac{\eta'_{th}}{\eta_{th}} = \frac{1}{1 - 0.200 + 0.154} = 1.05$$

This 5% fuel saving actually correlates reasonably well with the improvements in consumption which are known to be obtainable with this shortened-compression-stroke engine.

A further study of the two processes in the T-S diagram will show that a pre-exhaust occurs from point 6 to point 7 (and from 6' to 7'), associated with corresponding throttle losses, which imply an increase in entropy. A characteristic of the engine having a reduced compression stroke (dashed lines) is that the pressure difference (6'—7') to be bridged therein is less than in the standard process (6—7). As the foregoing calculations show, the pressure $P'_6$ is lower than the pressure $P_6$. Also, because of the higher supercharging pressure, the pressure upstream of the turbine is greater in the engine having a reduced compression stroke. Consequently, in the reduced compression stroke engine the increase of entropy during the pre-exhaust event is much less, and therefore energy losses are less than in the standard engine. The temperatures upstream of the turbine of an engine having a reduced compression stroke are therefore only slightly less than in the standard engine. Also, because of the greater charging pressure (greater air density), energy losses due to gas exchange in the engine are lower. It can be gathered from this that the enthalpy gradient available to the turbine suffices, just as in the standard process, to provide the required amount of supercharging air.

The T-S diagram also enables the following conclusion about exhaust loss to be made. Referred to the engine, the heat loss associated with the exhaust gases is calculated as follows:

$$Q_{exhaust\ gas} = G_{Lad}(T_7 |C_p|_0^{T_7} - T_2 |C_p|_0^{T_2}) \text{(Kcals. per hour)}$$

where $C_p$ is the specific heat at constant pressure.

Since $T'_7 \leq T_7$, it follows that $Q'_{exhaust\ gas}$ must be $\leq Q_{exhaust\ gas}$, since the other parameters are by definition, the same for both processes. This finding confirms the assumption made concerning estimated thermal efficiency, namely that the exhaust gas heat loss in the reduced compression stroke process is at most equal to the standard process and may even be less.

The diagram in FIG. 4 also shows that on partial load operation, since the charging pressure is less than for full load operation the compression temperature $T'_3$, which is also fairly low for full-load operation, may so drop that the engine ceases to operate on the diesel principle. To counteract this, in known engines having a reduced compression stroke, the closure time of the inlet valve is moved nearer bottom dead center. That is, the closure time is moved towards its position in the standard process with the full compression stroke. This adjustment of the valve closure time must be continuous in order to adapt to the state of engine operation, and therefore, considerably complicates the engine and increases the likelihood of disturbances.

According to the invention, however, in the light of the theoretical considerations set forth, the final temperature in the cylinder near the end of the compression stroke is prevented from falling during partial load operation of the engine by a corresponding reduction in cooling of the charging air. One simple way of doing this, for instance, is to use a bypass for the charging air, as shown at 14 in FIG. 1, such bypass extending around the cooler and having a throttle or closure element 20 adapted to be adjusted either manually, or automatically by a controller 22, in dependence upon an engine parameter which varies with the state of engine operation. The parameter can be, for instance, engine speed, engine torque, the quantity of fuel supplied per stroke, the fuel pump delivery pressure, the charging pressure of the air, the air temperature after compression in the supercharger, and so on.

If required, a similar bypass 28 can be provided in the coolant flow line 16 to the charging air cooler. Alternatively, the coolant flow through the cooler can be throttled or stopped by a throttling element 26 as required. This kind of control is simple but has greater control lag as compared with bypassing the air.

While the invention has been described herein in terms of the presently preferred practice and embodiment thereof, the invention is not limited thereto but comprehends all modifications thereof falling within the spirit and scope of the appended claims. Thus for example, the controller 22 may operate either on the valve 20 in the bypass line 14 for combustion air, or on the valve 26 in the coolant flow line 16, or on the valve 30 in the coolant flow bypass line 28. However connected, the controller will be arranged to vary as a direct function of engine output the cooling of the combustion air delivered by the supercharger 6 to the engine.

I claim:
1. The method of operating a supercharged diesel engine having a shortened effective compression stroke which comprises cooling the combustion air for said engine after compression of said air and before injection thereof into said engine, and varying said cooling directly with engine output.

2. The method of operating a supercharged diesel engine having a shortened effective compression stroke which comprises cooling the combustion air for said engine after compression of said air and before injection thereof into said engine, and reducing the cooling of said combustion air when said engine is operated at partial output.

3. The method of operating a supercharged diesel engine having inlet valve closure displaced from bottom dead center between the intake and compression strokes which comprises cooling the combustion air for said engine after compression of said air and before injection thereof into said engine, and varying said cooling directly with engine output.

4. A supercharged four-stroke cycle diesel engine comprising a cylinder, an inlet valve for said cylinder set to close at a phase displaced from bottom dead center preceding the compression stroke, a supercharger, a combustion air cooler disposed between the supercharger and the cylinder, and means to vary the cooling effect of said cooler as a direct function of engine power output.

References Cited
UNITED STATES PATENTS 3,029,594    4/1962    Miller _____ 123—119 X

FOREIGN PATENTS 950,020    2/1964    Great Britain.

MARK NEWMAN, *Primary Examiner.*

RALPH D. BLAKESLEE, *Examiner.*